(12) United States Patent  
Fischer

(10) Patent No.: US 9,570,945 B2  
(45) Date of Patent: Feb. 14, 2017

(54) ELECTRIC MOTOR

(75) Inventor: Peter Fischer, Billigheim-Allfeld (DE)

(73) Assignee: Grundfos Holding a/s, Bjerringbro (DK)

( * ) Notice: Subject to any disclaimer, the term of this patent is extended or adjusted under 35 U.S.C. 154(b) by 888 days.

(21) Appl. No.: 13/884,743

(22) PCT Filed: Nov. 2, 2011

(86) PCT No.: PCT/EP2011/069264  
§ 371 (c)(1),  
(2), (4) Date: Oct. 22, 2013

(87) PCT Pub. No.: WO2012/062639  
PCT Pub. Date: May 18, 2012

(65) Prior Publication Data  
US 2014/0035416 A1    Feb. 6, 2014

(30) Foreign Application Priority Data

Nov. 11, 2010 (DE) .......................... 10 2010 051 916  
Nov. 11, 2010 (DE) .......................... 10 2010 051 918  
Mar. 15, 2011 (EP) ..................................... 11002126

(51) Int. Cl.  
*H02K 5/22* (2006.01)  
*H02K 1/14* (2006.01)  
(Continued)

(52) U.S. Cl.  
CPC ............... *H02K 1/146* (2013.01); *F04B 49/06* (2013.01); *F04D 13/06* (2013.01); *F04D 13/064* (2013.01);  
(Continued)

(58) Field of Classification Search  
CPC .......... H02K 3/28; H02K 1/148; H02K 1/146; F04B 49/06; F04D 13/06  
(Continued)

(56) References Cited

U.S. PATENT DOCUMENTS 2,811,107 A    10/1957   Brill  
3,814,963 A     6/1974   Laing  
(Continued)

FOREIGN PATENT DOCUMENTS

DE    2242653 A1    3/1973  
DE    2262867 A1    7/1974  
(Continued)

OTHER PUBLICATIONS

Office Action issued Mar. 12, 2015 in CN Application No. 201180063886.9.

(Continued)

*Primary Examiner* — Terrance Kenerly  
(74) *Attorney, Agent, or Firm* — Panitch Schwarze Belisario & Nadel LLP

(57) ABSTRACT

An electric motor includes a stator, a rotor and a can arranged between the stator and the rotor, wherein the stator exhibits several stator pole pairs, which are each formed by two adjacent stator poles, which are designed in such a way as to generate oppositely polarized magnetic fields, and wherein the rotor exhibits a plurality of magnetic rotor poles distributed over the circumference, and is configured in such a way as to enable a magnetic flux between two adjacent rotor poles, as well as a pumping set with such an electric motor.

13 Claims, 3 Drawing Sheets

(51) Int. Cl.

| | |
|---|---|
| F04D 15/02 | (2006.01) |
| F04D 29/046 | (2006.01) |
| H02K 21/16 | (2006.01) |
| H02K 21/24 | (2006.01) |
| F04D 13/06 | (2006.01) |
| G05D 9/12 | (2006.01) |
| H02P 6/18 | (2016.01) |
| F04B 49/06 | (2006.01) |
| H02K 1/27 | (2006.01) |
| H02K 3/28 | (2006.01) |
| H02K 9/197 | (2006.01) |
| H02K 1/18 | (2006.01) |
| H02K 5/10 | (2006.01) |
| H02K 5/128 | (2006.01) |
| H02K 5/173 | (2006.01) |
| H02K 5/24 | (2006.01) |

(52) U.S. Cl.
CPC ....... *F04D 15/0218* (2013.01); *F04D 29/0467* (2013.01); *G05D 9/12* (2013.01); *H02K 1/148* (2013.01); *H02K 1/2753* (2013.01); *H02K 3/28* (2013.01); *H02K 5/128* (2013.01); *H02K 5/22* (2013.01); *H02K 9/197* (2013.01); *H02K 11/33* (2016.01); *H02K 21/16* (2013.01); *H02K 21/24* (2013.01); *H02P 6/182* (2013.01); *H02K 1/182* (2013.01); *H02K 5/10* (2013.01); *H02K 5/1282* (2013.01); *H02K 5/1737* (2013.01); *H02K 5/225* (2013.01); *H02K 5/24* (2013.01)

(58) Field of Classification Search
USPC .................................. 310/71, 156.66–156.71
See application file for complete search history.

(56) References Cited

U.S. PATENT DOCUMENTS

| | | | | |
|---|---|---|---|---|
| 4,043,706 | A | * | 8/1977 | Walker ................ F04D 29/0467 310/104 |
| 4,051,401 | A | | 9/1977 | Hayward |
| 4,352,646 | A | | 10/1982 | Laing et al. |
| 4,471,253 | A | | 9/1984 | Laing |
| 5,519,270 | A | * | 5/1996 | Yamada ............. G11B 19/2009 310/216.016 |
| 5,552,653 | A | | 9/1996 | Nose |
| 7,015,603 | B2 | | 3/2006 | Barrho et al. |
| 7,855,486 | B2 | | 12/2010 | Hasegawa |
| 8,680,739 | B2 | * | 3/2014 | Aoyama ................ H02K 1/141 310/216.023 |
| 2002/0098089 | A1 | | 7/2002 | Forsberg |
| 2005/0225192 | A1 | | 10/2005 | Kloepzig et al. |
| 2008/0007126 | A1 | | 1/2008 | Popov et al. |
| 2008/0246365 | A1 | * | 10/2008 | Wilsdorf ............... F03B 17/061 310/261.1 |
| 2009/0263259 | A1 | * | 10/2009 | Picton .................. B60H 1/3222 417/364 |
| 2010/0090635 | A1 | | 4/2010 | Andersen et al. |
| 2010/0111729 | A1 | | 5/2010 | Andersen et al. |
| 2010/0222729 | A1 | * | 9/2010 | Chin ....................... A61F 5/055 602/32 |
| 2011/0241454 | A1 | | 10/2011 | Staehr |
| 2013/0162073 | A1 | * | 6/2013 | You ........................ H02K 11/28 310/71 |

FOREIGN PATENT DOCUMENTS

| | | |
|---|---|---|
| DE | 3436510 A1 | 4/1986 |
| DE | 4225148 A1 | 2/1994 |
| DE | 19617083 A1 | 10/1997 |
| DE | 19646617 A1 | 5/1998 |
| DE | 102004017507 A1 | 10/2005 |
| DE | 102004027744 A1 | 12/2005 |
| DE | 102006026719 A1 | 12/2007 |
| DE | 102007042186 A1 | 3/2009 |
| DE | 202007018771 U1 | 3/2009 |
| DE | 102009048889 A1 | 5/2010 |
| EP | 0688088 A1 | 12/1995 |
| EP | 1063751 A1 | 12/2000 |
| EP | 1203886 A2 | 5/2002 |
| EP | 1947343 A1 | 7/2008 |
| EP | 1947753 A1 | 7/2008 |
| EP | 2040350 A2 | 3/2009 |
| JP | 2003-018797 A | 1/2003 |
| JP | 2008295222 | * 12/2008 |
| WO | 9305564 A1 | 3/1993 |
| WO | 9835424 A1 | 8/1998 |
| WO | 03103114 A1 | 12/2003 |
| WO | 2008019818 A1 | 2/2008 |
| WO | 2008135103 A1 | 11/2008 |
| WO | 2008150334 A1 | 12/2008 |
| WO | 2009006927 A1 | 1/2009 |
| WO | 2009012883 A2 | 1/2009 |
| WO | 2010031468 A1 | 3/2010 |

OTHER PUBLICATIONS

Int'l Search Report and Written Opinion issued Mar. 5, 2013 in Int'l Application No. PCT/EP2011/069261.
Int'l Search Report and Written Opinion issued Feb. 20, 2013 in Int'l Application No. PCT/EP2011/069260.
Int'l Search Report and Written Opinion issued Mar. 8, 2013 in Int'l Application No. PCT/EP2011/069340.
Int'l Search Report issued Mar. 15, 2013 in Int'l Application No. PCT/EP2011/069264.
Int'l Search Report issued Mar. 1, 2013 in Int'l Application No. PCT/EP2011/069262.
Office Action issued Apr. 1, 2011 in DE Application No. 10 2010 051 916.2.
Office Action issued Nov. 28, 2011 in DE Application No. 10 2010 051 918.9.

* cited by examiner

ELECTRIC MOTOR

CROSS-REFERENCE TO RELATED APPLICATIONS

This application is a Section 371 of International Application No. PCT/EP2011/069264, filed Nov. 2, 2011, which was published in the German language on May 18, 2012, under International Publication No. WO 2012/062639 A2 and the disclosure of which is incorporated herein by reference.

BACKGROUND OF THE INVENTION

Embodiments of the invention relate to an electric motor with a stator, a rotor and a can arranged between the stator and the rotor, i.e., a wet electric motor.

Such motors are used in particular in pumping sets, for example recirculation pumping sets, such as heating or industrial water recirculation pumps. Since products like these are mass-produced articles, there is a desire to design these products to be as cost-effective and easy to manufacture as possible. Another objective is to achieve the highest efficiency possible, so as to reduce the energy consumption of these pumping sets.

It is desirable to provide a wet electric motor as well as a pumping set with such a wet electric motor, which are cost effective to manufacture, and exhibit a high level of efficiency.

BRIEF SUMMARY OF THE INVENTION

The electric motor according to embodiments of the invention has a stator, a rotor and a can arranged between the stator and the rotor. The inside of the can is filled with liquid during operation, so that the rotor rotates in the liquid. According to embodiments of the invention, a can is here to be understood as any structural element suitable for separating the rotor chamber from the stator chamber, i.e., it does not necessarily have to be a tubular structural element, but rather can also be a differently shaped structural element, for example a disk or dome-shaped component.

The stator exhibits several stator pole pairs, wherein embodiments of the invention provide that the stator pole pairs are not formed by diametrically opposed stator poles as in known electric motors, but rather are each formed by two adjacent, i.e., neighboring stator poles. Each pole of the stator pole pair can be magnetized in the opposite direction. In other words, one pole has a magnetic north pole at its free end, while the other pole has a magnetic south pole at its free end. Magnetic fields oppositely polarized in a radial direction are preferably generated in this way. This is a configuration in which the stator poles are arranged circumferentially around the can. The stator poles preferably consist of a magnetically soft material in a known manner, for example sheet iron, and when exposed to current are magnetized by coils in a desired manner, thereby generating the magnetic fields for turning the rotor.

In order to allow the rotor to start interacting with the magnetic fields generated in the stator, it exhibits a plurality of permanent magnetic rotor poles distributed over the circumference. These are configured in such a way as to also enable a magnetic flux between two respective adjacent rotor poles. In known rotors of wet motors, the magnetic flux between two rotor poles generally takes place through the rotor to the diametrically opposed pole. Embodiments of the invention now provide that the magnetic flux takes place in the circumferential direction between two adjacent rotor poles. The advantage to this is that the entire rotor need not be fabricated out of magnetic material, whether it be magnetically hard or magnetically soft material, so as to ensure the magnetic flux. This reduces the quantity of required magnetic material, and the rotor can be made lighter overall, thereby reducing the mass to be moved. The advantage to designing the stator pole pairs by means of adjacent stator poles is that it simplifies the wiring of the coils comprising the individual stator pole. In addition, material can be economized in the stator, since no magnetically soft return bodies are required for linking diametrically opposing rotor poles. It is rather sufficient for the adjacent stator poles forming a stator pole pair to be joined together with magnetically soft return elements, thereby enabling a magnetic flux between these two stator poles. In addition to the savings in material, additional space is thus also created, which allows a more compact structural design for the entire electric motor.

The stator poles of a stator pole pair are preferably designed as pole webs, which are joined together by magnetically soft connection elements. The pole webs can here be individually configured and joined with the magnetically soft connection element. As an alternative, it is also conceivable for the pole webs and connection element to be designed as a single part or piece. Both the pole webs and connection element are preferably configured as a stack of sheets. For example, the pole webs extend in a radial or axial direction, parallel to the rotational axis of the motor, and are also preferably designed to accommodate coils.

The stator poles are further preferably designed as pole webs with coils arranged thereon, wherein the coils of two adjacent stator poles forming a stator pole pair are electrically connected in series. As a result of this arrangement, the two pole webs with the serially connected coils are each magnetized in the opposite direction when the coils are exposed to current, as described above.

Instead of arranging a respective coil on each of the stator poles, a special embodiment of the invention also allows the stator poles of a pole pair to exhibit a shared coil. For example, a coil could only be situated on one pole web. If the two pole webs are joined together at one end by a magnetically soft connection element, so that the stator pole pair is comprised of a U-shaped array of pole webs, the two pole webs joined with the connection element become oppositely magnetized even if a coil is situated only on one of the pole webs. If just one coil is used for a pole pair, more installation space can be made available for this single coil, so that this single coil can then be made larger in design, i.e., incorporate more windings.

It is further preferred that the stator poles of a stator pole pair be designed as pole webs that are joined together by a magnetically soft connection element, wherein at least one coil is situated on the connection element. Arranging the coil on the connection element is a very easy way to achieve a uniform magnetization of both pole webs when the coils are exposed to current.

In another preferred embodiment, the coils of the stator poles of two diametrically opposed stator pole pairs are electrically connected in series. In this way, two respective diametrically opposed stator pole pairs can be exposed to a current at the same time. If a stator pole pair exhibits two respective coils, each on one of the matching stator poles, the coils of each stator pole pair are preferably connected in series, with these coil pairs of diametrically opposed stator pole pairs then being connected in series.

It makes sense for all coils of the stator to exhibit the same design. This reduces the variety of parts, and simplifies manufacture and/or assembly.

It is especially preferred that the coils be wired together via a circuit board arranged on the stator. To this end, for example, the coils can exhibit axially protruding contacts, which engage corresponding contacts or conducting paths on the circuit board in an electrically conductive manner. For example, the contact elements can be designed as axially protruding contact pins, which extend into corresponding holes of the circuit board, and are there electrically contacted with conductor paths of the circuit board by means of a plug-in coupling or, for example, through soldering. The use of such a circuit board, which is placed on the coils or abutted against all coils, makes it very easy to electrically wire the coils. In this way, all coils can be separately prefabricated, and then contacted via the printed circuit during assembly. Individual winding wires need not be routed from one coil to the other coil.

It is further preferred that the circuit board exhibit at least parts that comprise the engine electronics. The circuit board can thus have situated directly on it electronic components, which are used to control or operate the electric motor. In particular, parts of a frequency inverter or electronic circuit breakers can here be involved, which are responsible for the targeted supply of current to the individual coils. Integrating these parts on a circuit board situated directly on the stator yields a very compact structural design, in which the essential electronic components for operating the motor can be situated with the stator and circuit board directly in a stator casing.

For example, the electric motor can be designed as a 3-phase motor, wherein it then preferably has six stator pole pairs. A respective two diametrically opposed stator pole pairs of these six stator pole pairs can exhibit coils connected in series as described above, so that current is always supplied to two opposing stator pole pairs at the same time, thereby yielding the 3-phase configuration. As an alternative, for example, the electric motor could also be designed as a 2-phase motor, wherein it then could have four or eight stator pole pairs, which are designed in the above way, and have stator coils wired as described above.

In another preferred embodiment, the rotor is Halbach magnetized. This magnetization creates a strong magnetic field on the outer circumference of the rotor and a diminished magnetic field inside the rotor. The magnetic flux between the rotor poles here takes place near the surface in the circumferential direction, eliminating the need for a magnetic flux to a diametrically opposed rotor pole through the rotor. As described above, the rotor can be made lighter on the inside, since the arrangement of magnetically soft or hard material for ensuring the magnetic flux can there be omitted.

The rotor preferably has a pole ring made out of magnetic material, in which the rotor poles are formed. The pole ring is formed out of a magnetically hard material, which incorporates the magnetic rotor poles through corresponding magnetization. The Halbach magnetization described above can here be used. The outer circumference of the rotor exhibits alternating north and south poles, and the magnetic flux between the rotor poles takes place in the circumferential direction through the material of the pole ring. If necessary, the pole ring can to this end exhibit an annular back feed made out of magnetically soft material in its radial interior.

The electric motor is preferably designed as a spherical motor with a can designed as a separating calotte. In such a motor, the separating calotte exhibits a semispherical shape, and the rotor has a corresponding semispherical surface, so that the rotor can be concentrically situated in the separating calotte. The rotor is here mounted on a ball bearing, whose surface also lies concentric to the rotor surface and separating calotte. In this way, the rotor can not only rotate around the ball bearing, but also float transverse to the rotational axis.

Embodiments of the invention also relate to a pumping set, which exhibits an electric motor according to the preceding description as the drive motor. In particular, this pumping set can be a recirculation pumping set, for example a heating or industrial water recirculation pumping set. As described above, a cost-effective configuration and high level of efficiency are critical for the latter, since these pumping sets have long running times, so that special value is here placed on energy efficiency.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
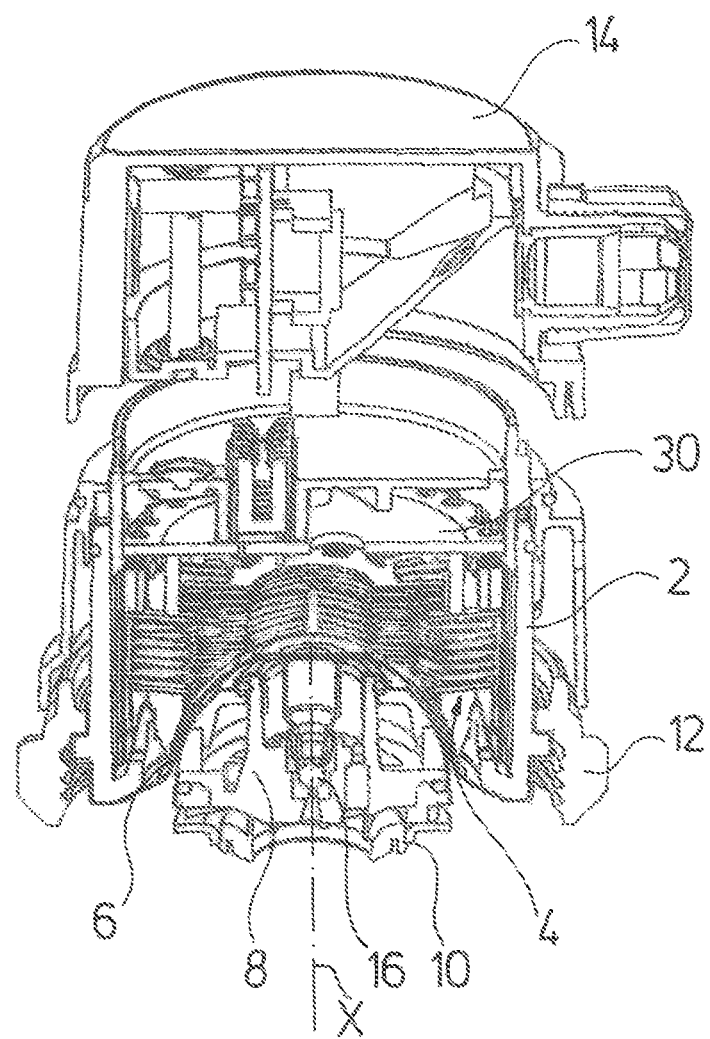
FIG. 1 A partially cut and exploded view of an electric motor according to an embodiments of the invention, FIG. 2 A cut detailed view of the stator of the electric motor according to FIG. 1, and FIG. 3 A schematic section of the pole ring of the rotor according to FIG. 1.

The motor depicted on FIG. 1 includes part of a recirculation pumping set. The motor includes a stator casing 2, the interior of which accommodates a stator 4. The stator 4 envelops a can 6, which divides the stator chamber inside the stator casing 2 from a rotor chamber, which incorporates the rotor 8. The free axial face of the rotor 8 carries an impeller 10 of the pumping set. Not shown here is a pump housing that envelops the impeller 10. The latter is fixed to the stator casing 2 by way of the retainer nut 12. An electronics housing 14 axially abuts against the axial end of the stator casing 2 facing away from the rotor 8.

The electric motor shown here is a spherical motor, i.e., the can 6 is designed as a dome-shaped or semispherical separating calotte, and the rotor 8 is correspondingly semispherical in design and mounted on a ball bearing 16. Mounting the latter on the ball bearing 16 allows the rotor not just to rotate around the rotational axis X, but also to float normal to the rotational axis X to some extent. The outer circumference of the rotor 8 exhibits a pole ring 18, in which permanent magnetic rotor poles are formed. To this end, the pole ring 18 is made out of a magnetically hard material, and correspondingly magnetized.

Figure 2:
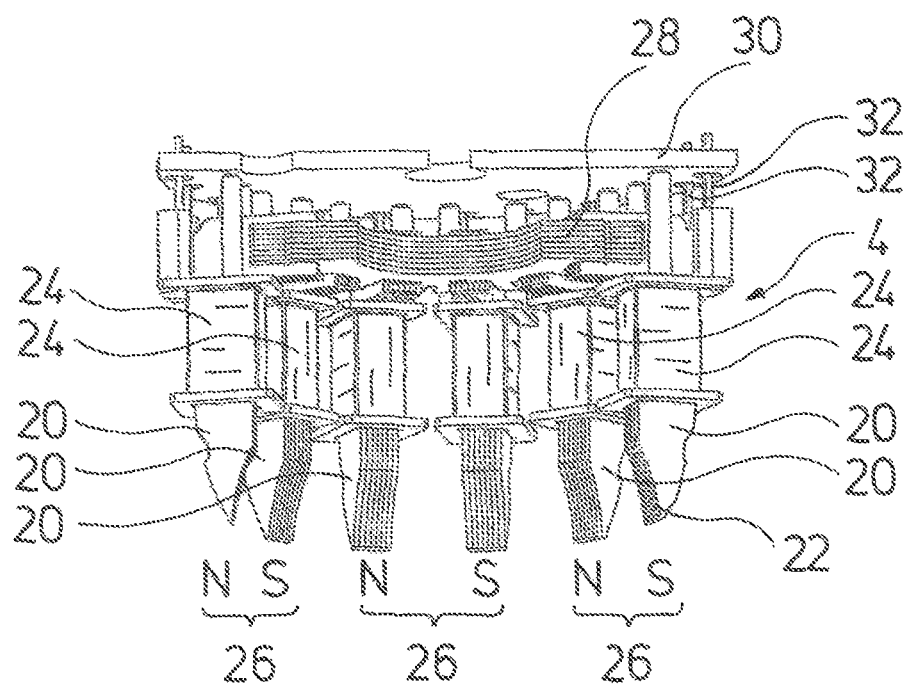

The stator 4 shown in detail on FIG. 2 includes a plurality of pole webs 20 that extend axially, i.e., parallel to the rotational axis X. At their free end 22, the pole webs 20 are each curved so as to correspond to the shape of the can 6, so that the pole webs 20 can come to abut against the can 6 from outside with their free ends 22. The pole webs 20 are designed in a known manner as stacks of sheets composed of a magnetically soft material, in particular sheet iron. Each pole web 20 carries a coil 24, which when supplied with current causes the respective pole web 20 to become magnetized. The coils 24 are electrically interconnected in such a way that two adjacent coils 24 are always connected in series, so that two adjacent pole webs 20 comprise a stator pole pair 26. Because the coils 24 on the pole webs 20 of a stator pole pair 26 are connected in series, opposite magnetic fields are generated in the neighboring pole webs when the coils 24 are supplied with current; as schematically depicted on FIG. 2, a magnetic south pole S is generated at the free end of a pole web, and a magnetic north pole N is generated at the free end of a pole web. In the example shown here, all pole webs 20 are joined together by an annular, magnetically soft connection element 28. However, let it be understood that the connection element 28 would not have to be continuous in design, but rather that only the pole webs 20 of a stator pole pair 26 could be joined together by such a magnetically soft connection element 28. A connection to the other pole webs is not required, since the magnetic flux always takes place only inside a stator pole pair from one pole web 20 to the adjacent pole web 20. In addition, it is also not absolutely necessary that a coil 24 be situated on each of the pole webs 20. Rather, just a single coil could also be situated in each stator pole pair 26, for example on the connection element 28 that joins the two pole webs 20 together.

Apart from the coils 24 of a stator pole pair 26 being connected in series, the coils 24 of a diametrically opposed stator pole pair 26 of the stator 4 are also connected in series with these coils 24. In the arrangement of twelve pole webs 20 shown here, three groups of coils 24 that can be supplied with current simultaneously are created, i.e., a three-phase motor is involved here. In this exemplary embodiment, the coils 24 are electrically wired via a circuit board 30, in which the individual coils 24 engage with terminal pins 32 to establish electrical contact. The circuit board 30 can additionally carry electronic components that comprise the engine electronics, so that essential parts of the engine electronics can here be integrated into the stator casing 2.

Figure 3:
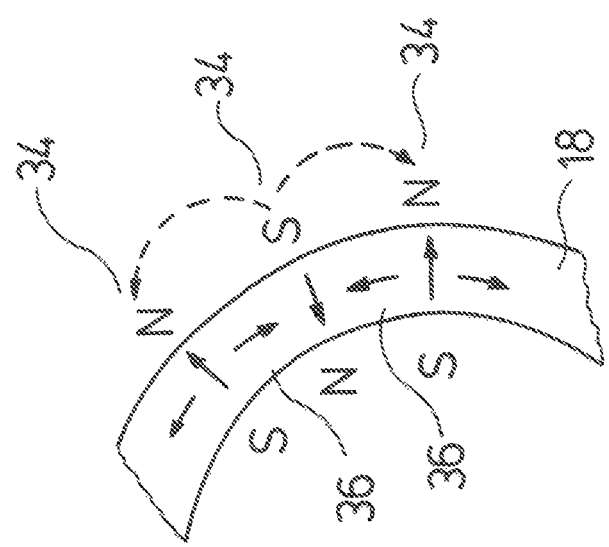

As explained above, the rotor 8 has a pole ring 18. The individual rotor poles 34 are formed in the latter through magnetization, as shown on FIG. 3. This exemplary embodiment provides for a Halbach magnetization as depicted on FIG. 3. In the latter, an intermediate section 36 magnetized in the circumferential direction is respectively provided between the radially magnetized rotor poles 34. The direction of magnetization is denoted by the arrows on FIG. 3 as being from the south pole toward the north pole. As the result of this type of magnetization, the magnetic fields are essentially directed toward the outer circumference of the rotor, and not into the rotor interior. In other words, magnetic fields are generated in particular on the outside of the pole ring 18 facing the stator 4. Since the magnetic flux through the pole ring also takes place here from one rotor pole 34 directly to the adjacent rotor pole 34, and not to the diametrically opposed rotor pole, magnetic material need not be provided inside the rotor 8, whether it be magnetically soft or magnetically hard material. As evident from FIG. 1, the inside of the rotor can rather be given an essentially hollow, and hence lightweight, design. In addition, the mounting on the ball bearing 16 can be situated inside the rotor 8.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An electric motor comprising a stator (4), a circuit board (30) mounted on the stator (4), a rotor (8), and a can (6) arranged between the stator (4) and the rotor (8), wherein
the stator (4) includes several stator pole pairs (26), which are each formed by two adjacent stator poles (20), which are configured to generate oppositely polarized magnetic fields, wherein the stator poles are designed as pole webs (20) with coils (24) arranged thereon, the coils (24) of two adjacent stator poles (20) forming a stator pole pair (26) are electrically connected in series, all coils (24) have the same design, the coils (24) are wired to one another via the circuit board, and the coils (24) have axially protruding contacts which engage corresponding contacts or conducting paths on the circuit board to form an electrical connection, and wherein
the rotor (8) includes a plurality of magnetic rotor poles (34) distributed over a circumference of the rotor, and is configured to enable a magnetic flux between two adjacent rotor poles (34).

2. The electric motor according to claim 1, wherein the stator poles of a stator pole pair (26) are designed as pole webs (20), which are joined together by a magnetically soft connection element (28).

3. The electric motor according to claim 1, wherein the stator poles (20) of a pole pair (26) include a shared coil.

4. The electric motor according to claim 3, wherein the stator poles (20) of a stator pole pair (26) are designed as pole webs (20), which are joined together by a magnetically soft connection element (28), wherein at least one coil is situated on the connection element.

5. The electric motor according to claim 1, wherein the coils (24) of the stator poles (20) of two diametrically opposed stator pole pairs (26) are electrically connected in series.

6. The electric motor according to claim 1, wherein the circuit board (30) carries at least parts comprising engine electronics.

7. The electric motor according to claim 1, wherein the electric motor is designed as a 3-phase motor with six stator pole pairs.

8. The electric motor according to claim 1, wherein the rotor (8) is Halbach magnetized.

9. The electric motor according to claim 1, wherein the rotor (8) has a pole ring (18) made out of a magnetic material, in which the rotor poles (34) are formed.

10. The electric motor according to claim 1, wherein the motor is designed as a spherical motor with a can (6) designed as a separating calotte.

11. A pumping set, comprising an electric motor according to claim 1 as the drive motor.

12. A pumping set according to claim 11, wherein the pumping set is designed as a recirculation pumping set.

13. A pumping set according to claim 12, wherein the pumping set is a heating or industrial water recirculation pumping set.

* * * * *